(12) United States Patent
Yu et al.

(10) Patent No.: US 7,676,805 B2
(45) Date of Patent: Mar. 9, 2010

(54) WIRELESS SENSOR NODE EXECUTABLE CODE REQUEST FACILITATION METHOD AND APPARATUS

(75) Inventors: Yang Yu, Rolling Meadows, IL (US); Loren J. Rittle, Naperville, IL (US)

(73) Assignee: Motorola, Inc., Schaumburg, IL (US)

( * ) Notice: Subject to any disclaimer, the term of this patent is extended or adjusted under 35 U.S.C. 154(b) by 561 days.

(21) Appl. No.: 11/278,680

(22) Filed: Apr. 5, 2006

(65) Prior Publication Data
US 2007/0236345 A1 Oct. 11, 2007

(51) Int. Cl.
*G06F 9/45* (2006.01)
(52) U.S. Cl. .................................... 717/176
(58) Field of Classification Search ............... 717/176
See application file for complete search history.

(56) References Cited

U.S. PATENT DOCUMENTS

| | | | |
|---|---|---|---|
| 5,745,483 A | 4/1998 | Nakagawa et al. | |
| 5,802,367 A * | 9/1998 | Held et al. ............... | 719/332 |
| 6,360,264 B1 * | 3/2002 | Rom ....................... | 709/227 |
| 6,421,731 B1 * | 7/2002 | Ciotti et al. .............. | 709/238 |
| 6,813,631 B2 | 11/2004 | Pouchak et al. | |
| 6,817,016 B1 | 11/2004 | Wegman et al. | |
| 6,973,309 B1 * | 12/2005 | Rygula et al. ............ | 455/436 |
| 6,990,316 B2 * | 1/2006 | Heinonen et al. ........ | 455/41.2 |
| 7,012,394 B2 | 3/2006 | Moore et al. | |
| 7,020,701 B1 | 3/2006 | Gelvin et al. | |
| 7,408,911 B2 * | 8/2008 | Joshi ....................... | 370/338 |
| 2002/0151297 A1 | 10/2002 | Remboski | |
| 2003/0005167 A1 * | 1/2003 | Khare et al. ............. | 709/310 |
| 2003/0065743 A1 * | 4/2003 | Jenny et al. ............. | 709/219 |
| 2004/0064351 A1 | 4/2004 | Mikurak | |
| 2004/0098447 A1 | 5/2004 | Verbeke et al. | |
| 2004/0133640 A1 | 7/2004 | Yeager et al. | |
| 2004/0136358 A1 * | 7/2004 | Hind et al. ............... | 370/352 |
| 2004/0162871 A1 | 8/2004 | Pabla et al. | |
| 2004/0215791 A1 | 10/2004 | Tsao | |
| 2004/0268322 A1 | 12/2004 | Chow et al. | |
| 2005/0120346 A1 * | 6/2005 | Sprigg ..................... | 717/176 |
| 2005/0141465 A1 * | 6/2005 | Kato et al. ............... | 370/337 |
| 2005/0160195 A1 | 7/2005 | Bruner et al. | |
| 2005/0289266 A1 | 12/2005 | Illowsky et al. | |

(Continued)

OTHER PUBLICATIONS

Yu, Y. et al.: MELETE: Concurrent Applications in Wireless Sensor Networks, Submitted to ACM SenSys 2006, 14 pages.

(Continued)

*Primary Examiner*—John Chavis

(57) ABSTRACT

A wireless sensor node can request, responds to requests for, and maintain executable code (101), including executable code for which the wireless sensor node is itself tasked with executing. Upon receiving (102), however, a request for executable code that the wireless sensor node is not itself tasked with executing, one determines (103) whether to forward that request. This determination can be based upon any of a variety of decision-making criteria as may pertain to a given application setting (such as whether a different wireless sensor node is, in fact, already responding to this request for executable code, information regarding a number of hops to a known point of executable code injection as may be required to facilitate transport of the executable code from that source to a requesting wireless sensor node, and whether the wireless sensor node itself has locally cached the requested executable code).

20 Claims, 2 Drawing Sheets

U.S. PATENT DOCUMENTS

| | | |
|---|---|---|
| 2006/0049271 A1 | 3/2006 | Hitt |
| 2006/0126524 A1 | 6/2006 | Tateson |
| 2006/0178156 A1 | 8/2006 | Kim |
| 2006/0215588 A1 | 9/2006 | Yoon |
| 2006/0271661 A1 | 11/2006 | Qi et al. |

OTHER PUBLICATIONS

A. Howard, M.J. Mataricie and G.S. Sukhatma, "Mobile sensor network deployment using potential fields: A distributed, scalable solution to the area coverage problem", International Symposium on Distributed Autonomous Robotics Systems, Jun. 2002.

B. Lui, P. Brass, and O. Dousse, "Mobility improves coverage of sensor networks", ACM MobiHoc, May 2005.

N. Bisnik, A. Abouzeid, and V. Isler, "Stochastic event capture using mobile sensors subject to a quality metric", ACM/IEEE MobiCom, Sep. 2006.

Y. Zou and K. Charabarty, "Sensor deployment and target localization based on virtual forces", IEEE InfoCom, Apr. 2003.

S. Meguerdichian, F. Koushanfara, M. Potkonjak, and M.B. Srivastava, "Coverage problems in wireless ad-hoc sensor networks", IEEE InfoCom, Mar. 2001, pp. 1380-1387.

D. Tian and N.D. Georganas, "A coverage-preserving node scheduling scheme for large wireless sensor networks", ACM WSNA, Sep. 2002.

C-F Huang and Y-C Tseng, "The coverage problem in a wireless sensor network", SCM WSNA, Sep. 2003.

S. Shakkotai, R. Srikant and N. Shroff, "Unreliable sensor grids: Coverage, connectivity and diameter", IEEE InfoCom, Mar. 2003.

X. Wang, G. Xing, Y. Zhang, C. Lu, R. Pless, and C. Grill, "Integrated coverage and connectivity configuration wireless sensor networks", ACM SenSys, Nov. 2003, pp. 28-39.

S. Kumar, T.H. Lai and J. Balogh, "On k-coverage in a mostly sleeping sensor network", ACM MobiHoc, Jun. 2004, pp. 144-158.

G. Wang, G. Cao, and T.L. Porta, "Movement-assisted sensor deployment", IEEE InfoCom, Mar. 2004.

www.swarm-bot.org, Oct. 1, 2001.

B. Gerkey and M. Mataric, "A formal analysis and taxonomy of task allocation in multi-robot systems", Intl. J. of Robotics Research 23(9), Sep. 2004, pp. 939-954.

Levis, et al., "Mate: A Tiny Machine for Sensor Networks," International Conference on Architectural Support for Programming Languages and Operating Systems, San Jos, CA Oct. 2002, 11 pages.

Chan, et al., "ACE: An Emergent Algorithm for Highly Uniform Cluster Formation," Proceedings of the 1st European Workshop on Sensor Networks (EWSN), Jan. 2004, 16 pages.

Frank, et al., "Algorithms for generic Role Assignment in Wireless Sensor Networks," Proceedings of the 3rd ACM Conference on Embedded Networked Sensor Systems (SenSYS), Nov. 2005, 13 pages.

Liu, et al., "State-Centric Programming for Sensor-Actuator Network Systems," IEEE Pervasive Computing, Oct.-Dec. 2003, pp. 50-62.

Steffan, et al., "Towards multi-Purpose Wireless Sensor Networks," ICW, 2005 Systems Communications (ICW'05, ICHSN'05, ICMCS'05, SENET'05) 2005, pp. 336-341.

Hsieh et al., "Efficient Localization in Mobile Wireless Sensor Networks," IEEE International Conference on Sensor Networks, Ubiquitous and Trustworthy Computing 2006, vol. 1, Jun. 5-7, 2006, pp. 292-297.

Chung et al., "Ubiquitous Zone (U-Zone) based Community Networking Technologies," 3rd Annual IEEE Communications Society on Sensor and Ad Hoc Communications and Networks, SECON '06, vol. 2, Sep. 28, 2006, pp. 678-683.

Han, et al., "Senor Network Software Update Management: A Survey," International Journal of Network Management, 2005, 15: pp. 283-294.

\* cited by examiner

WIRELESS SENSOR NODE EXECUTABLE CODE REQUEST FACILITATION METHOD AND APPARATUS

RELATED APPLICATIONS

This invention relates generally to WIRELESS SENSOR NODE GROUP AFFILIATION METHOD AND APPARATUS as bears U.S. Patent Application Publication No. 2007/0266078 as was filed on even date herewith, and METHOD AND APPARATUS TO FACILITATE AUTOMATIC SELECTION OF SOFTWARE PROGRAMS TO BE DISTRIBUTED TO NETWORK ELEMENTS as bears U.S. Patent Publication No. 2007/0192489 as was filed on Feb. 14, 2006, the contents of which are fully incorporated herein by this reference.

TECHNICAL FIELD

This invention relates generally to wireless sensor nodes and more particularly to the provisioning of executable code.

BACKGROUND

Various wireless sensor nodes are known in the art. Such wireless sensor nodes often comprise programmable software-based platforms. In some cases, though programmable, such platforms may comprise dedicated-purpose platforms and hence remain essentially unaltered over the course of a usable operational life. In many other cases, however, such platforms are updated from time to time as an expected and normal operational event. An example of the latter comprises Mate virtual machine-based platforms that support a relatively small executable environment having, for example, four loading points to receive corresponding discrete software programs on a relatively dynamic basis. Such platforms have use, for example, in conjunction with ad hoc wireless sensing node networks.

Such wireless sensor nodes are often physically distributed with respect to one another. For example, a plurality of wireless sensor nodes may be distributed throughout a building to monitor various environmental circumstances of interest (such as temperature, humidity, proximal human activity, noise, motion, and essentially any other sensable condition that might occur proximal to such a sensor). In some cases these various wireless sensor nodes may be tasked differently from one another. For example, some wireless sensor nodes may be tasked with measuring temperature while other wireless sensor nodes might be tasked only with measuring local noise conditions. It is also possible that such tasking assignments will change dynamically over time.

Many such network elements, however, comprise relatively resource-poor operational platforms. Significant limitations may exist, for example, with respect to available memory, computational capacity, computational scheduling, power resources, power consumption (including power consumption scheduling), multi-tasking capabilities, peripherals management, and so forth. In a typical deployment it is also likely that multi-hop data conveyance paths will be necessary to move data or executable code from a given wireless sensor node to a corresponding data collection point.

Network configurations and protocols are known that attempt to meet such re-programming needs in a manner that accommodates such limitations. The so-called trickle mode of operation represents one such example (see, for example "Trickle: A Self-Regulating Algorithm for Code Propagation and Maintenance in Wireless Sensor Networks" by Levis, et al. as appears in the March 2004 publication USENIX/ACM Symposium on Networked Systems Design and Implementation). Pursuant to the trickle mode of operation a wireless sensor node is able to share its executable code programming with another wireless sensor node that does not already have such programming (as such, the programming may be viewed as trickling from an initial source through the wireless sensor node network until all of the wireless sensor nodes have received the new programming). This trickle mode of operation is typically used in settings where each and every sensor node within a given network is to be identically programmed.

Unfortunately, such prior art solutions are not wholly adequate for all application settings. For example, as noted above, it is possible for different wireless sensor nodes in a given network to be tasked in different ways. As a result, different wireless sensor nodes can be expected to have different executable code programming needs and resources. Existing solutions are poorly suited to ensure that executable code requirements are met in an efficient manner that is sensitive and accommodating to the many needs and requirements of a typical wireless sensor node network.

BRIEF DESCRIPTION OF THE DRAWINGS

The above needs are at least partially met through provision of the wireless sensor node executable code request facilitation method and apparatus described in the following detailed description, particularly when studied in conjunction with the drawings, wherein.

Figure 1:
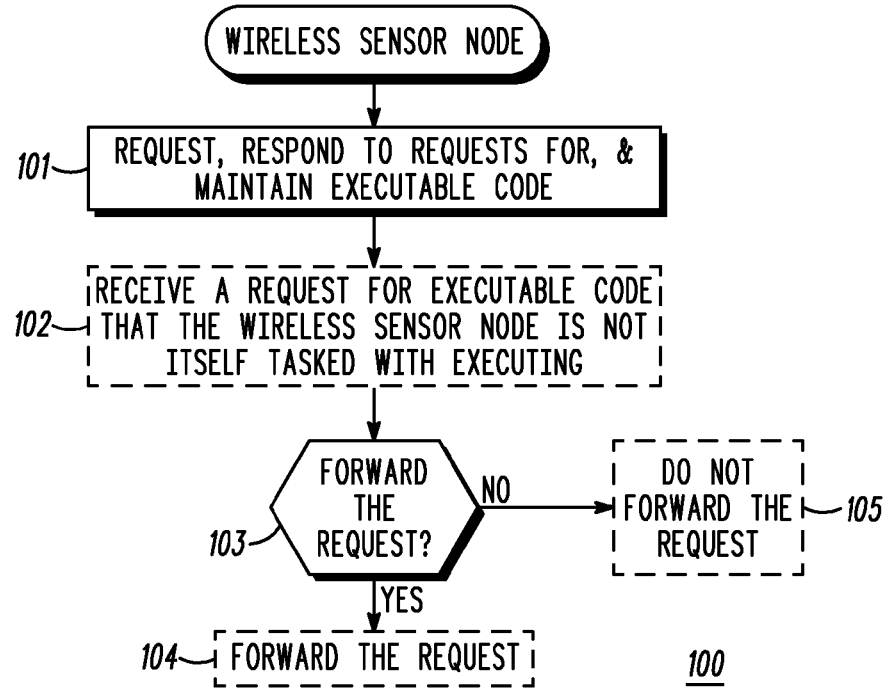
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, a wireless sensor node can request, respond to requests for, and maintain executable code. This can comprise effecting such efforts with respect to executable code for which the wireless sensor node is itself tasked with execution. Upon receiving, however, a request for executable code that the wireless sensor node is not itself tasked with executing, these teachings further provide for then determining whether to forward that request.

This determination can be based upon any of a variety of decision-making criteria as may pertain to a given application setting. By one approach this determination can comprise determining whether a different wireless sensor node is, in fact, already responding to this request for executable code. As another example, by one approach this determination can comprise basing this determination upon a number of hops to a known point of executable code injection that may be required to facilitate transport of the executable code from that source to a requesting wireless sensor node. As yet another example, this determination can include consideration of whether the wireless sensor node itself has locally cached the requested executable code (notwithstanding that this wireless sensor node is not itself tasked with executing such code).

So configured, a given wireless sensor node can request and receive executable code that it may require to carry out its tasked requirements while nevertheless tending to avoid a resource-sapping over-response by the wireless sensor node network to this request. For example, a given wireless sensor node can elect to remain quiescent in this regard upon determining that another wireless sensor node is already attending to the request for executable code. As another example, a given wireless sensor node can elect to remain quiescent when it appears that an undue number of hops (between wireless sensor nodes) may be required to obtain the requested executable code from a given source. As yet another example, a given wireless sensor node that happens to have a cached version of the requested executable code can act to provide that executable code to the request wireless sensor node when such is available and thereby avoid the need to forward the request.

Such flexibility, in turn, permits an ability to more aggressively leverage a given network of deployed wireless sensor nodes. In particular, such resources can be more freely re-programmed and/or re-tasked without necessarily creating undue concerns regarding depleting or degrading the ability of the network to maintain its operational viability. Those skilled in the art will recognize and appreciate that these benefits accrue without necessarily requiring a complicated central control capability, platform, or resource.

These and other benefits may become clearer upon making a thorough review and study of the following detailed description. Referring now to the drawings, and in particular to FIG. 1, an illustrative corresponding process 100 as may be effected by a wireless sensor node of choice can comprise requesting, responding to requests for, and maintaining 101 executable code. In a typical deployment this executable code will comprise operating instructions that cause or enable the wireless sensor node to carry out one or more of its assigned tasks. As one illustrative example in this regard, this executable code might comprise the instructions that cause a given wireless sensor node to awaken at particular intervals, take an ambient temperature reading, and store that reading pending subsequent use or transmission of that data.

Such functionality when applied to the propagation and usage of a given instruction set universally throughout a network of wireless sensor nodes currently exists. As but one illustrative example, Mate virtual machine protocols can be used to trickle and/or flood such a network with executable code that is to be executed by all of the constituents of the network. For the sake of brevity, then, further elaboration regarding such capabilities will not be presented here. It will be noted, however, that these teachings can leverage such capabilities to permit these wireless sensor nodes to further act in a similar, though different, manner with respect to the propagation of executable code that at least certain of the individual nodes are not themselves otherwise tasked to utilize.

In this regard, this process 100 may provide for optionally receiving 102 a request for executable code that the wireless sensor node is not itself tasked with executing from another wireless sensor node. In accord with many wireless sensor node networks, this request may be directly received from the requesting wireless sensor node or may be received via a forwarding wireless sensor node when multiple transmission hops are useful or necessary in this regard. By these teachings, upon receiving 102 such a request, the wireless sensor node is able to recognize the request for what it is and to provide for further informed handling of that request. Such an approach, of course, contrasts sharply with much prior art practice where such a node will typically either always effectively ignore such a request for executable code for which the wireless sensor node is otherwise not tasked to execute or will always immediately act to respond to that request based upon an assumption that all wireless sensor nodes in a given network are to be identically configured and provisioned.

Accordingly, pursuant to this process 100, the wireless sensor node then determines 103 whether to forward that request for executable code in order to assist with that request. This determination can be based upon a variety of decision-making criteria. Those skilled in the art will understand that such criteria will likely vary from one application setting to another. Some relevant examples likely include (but are not limited to):

Determining whether the wireless sensor node has a locally cached (complete or partial) version of the requested executable code. It may be desirable, for example, to permit local caching of executable code that the caching wireless sensor node is not otherwise tasked to execute when local resources permit in order to hold such code in reserve for responding to just such a request as this. In such a case, when such content is in fact locally available, this determination 103 can comprise a decision to not forward 105 the request and to instead respond directly to the request with provision of the locally cached executable code.

Determining whether yet another wireless sensor node is responding to the request for the executable code. Such an approach can be supplemented, for example, by waiting a predetermined period of time before proceeding further to thereby provide time for the yet another wireless sensor node to so respond. By one approach the predetermined period of time as is used by any given wireless sensor node can comprise a relatively static value that corresponds to that particular wireless sensor node. By another approach this predetermined period of time can comprise a more dynamic value that changes over time. As but one example in this regard, the wireless sensor node can re-determine an essentially random number upon receiving such a request for executable code and then use that re-determined number to derive this predetermined period of time.

Determining whether yet another wireless sensor node is forwarding the request for the executable code. Such an approach can be supplemented, for example, by waiting a predetermined period of time before proceeding further to thereby provide time for the yet another wireless sensor node to so forward. The time period could be calculated as described above.

Basing the determination, at least in part, upon a number of hops as may be required to facilitate transport of the executable code from a source (comprising, for example, a known point of executable code injection such as a network gateway) to the requesting wireless sensor node. By one approach in this regard the wireless sensor node can be configured and arranged to determine not to forward 105 the request when the number of likely required hops exceeds a threshold value in this regard. The request for executable code itself might include information that can be used to comprise, derive, or at least influence this threshold value. For example, in one set of different deployment settings, the wireless sensor node may compute that its relative position to the source, as measured by expected hop count, is greater than that of the requesting wireless sensor node. Such hop count information might be contained in the request or it might be locally referenced based on the source identification contained within the request. As another example, when the executable code pertains to a mission-critical network task, a corresponding high priority indicator may be used to signal that any number of hops may be accepted in that particular instance.

Upon making an informed decision 103 that the received request for executable code should be forwarded, this process 100 will readily accommodate the forwarding 104 of that request. Such forwarding may be carried out using any presently available bearer technology and/or protocol as may be preferred in a given application setting. As such information is readily available to the skilled artisan, and as these teachings are otherwise relatively insensitive to the selection of any particular approach in this regard, no further detail in this regard will be provided here for the sake of brevity.

Figure 2:
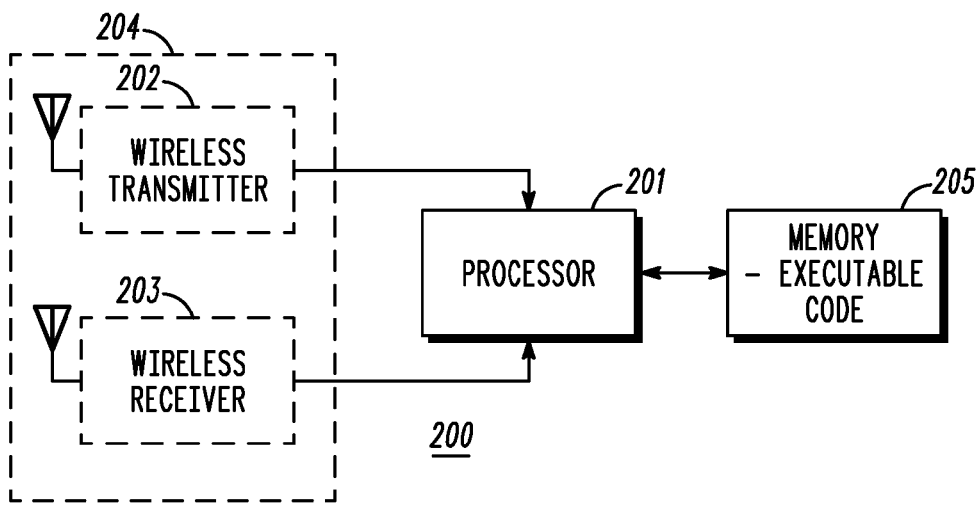
FIG. 2 comprises a block diagram as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 2, an illustrative approach to such a platform will now be provided.

In this illustrative example a wireless sensor node 200 can be comprised of a processor 201 that operably couples to each of a wireless transmitter 202, a wireless receiver 203, and a memory 205. The wireless transmitter 202 and wireless receiver 203 can, if desired, be discrete components or can, if desired, comprise a part of a common transceiver 204. Such architectural choices are known in the art and require no further description here.

By one approach the memory 205 serves to store the aforementioned executable code therein. This can comprise the executable code that the wireless sensor node 200 is itself tasked to execute but may also comprise untasked executable code when local caching of such content is permitted as per the delineations of a given deployment.

The processor 201 may be configured and arranged, via, for example, appropriate programming, to carry out selected portions of the above-described process. This can comprise making the above-described decision regarding whether to forward a request for executable code when the executable code does not comprise content that the wireless sensor node 200 is tasked to carry out.

Those skilled in the art will recognize and understand that such an apparatus may be comprised of a plurality of physically distinct elements as is suggested by the illustration shown in FIG. 2. It is also possible, however, to view this illustration as comprising a logical view, in which case one or more of these elements can be enabled and realized via a shared platform and/or via a distributed platform. It will also be understood that such a shared platform may comprise a wholly or at least partially programmable platform as are known in the art.

Those skilled in the art will appreciate that these teachings significantly enhance the ability of a wireless sensor node network to efficiently and effectively support, simultaneously and/or dynamically, more than one application at a time. This, in turn, better suits the needs of networks where an expectation or need exists regarding network sharing by different enterprises (or divisions within an enterprise) having different purposes and agendas. It will further be appreciated that these teachings are eminently scalable and therefore readily applicable to networks of varying size as well as scope. As noted, these teachings are readily applied using the virtual machine concepts of Mate in conjunction with trickle program code dissemination techniques. Some additional comments in that regard may be beneficial to some readers.

Searching comprises an important technique for many wireless networks such as ad hoc and sensor node networks. Many existing search strategies are represented by the n-ring model. In this model, searching comprises effecting n consecutive attempts using an incremental searching radius for each attempt. As all attempts are initiated from a searching node, each attempt to re-search will cover areas already included in previous attempts. To overcome this inefficiency of the n-ring model approach, one can employ instead a progressive searching strategy by which one autonomously increases the search radius without intervention of the searching node itself. This can be realized, for example, by leveraging periodic trickle broadcasts instead of relying upon one-shot n-ring model broadcasts as are more typically employed.

This progressive searching strategy can be based, if desired, upon a relatively simple query having a stable value. Such an approach, of course, is at variance with other progressive search methods such as the ACQUIRE approach but may nevertheless offer advantages in at least some application settings. Those skilled in the art will recognize and appreciate that various so-called flooding techniques (such as n-ring, ACQUIRE, rumor routing, and the like) can be employed in conjunction with these teachings but that the specific flooding technique represented by the trickle approach (which might be viewed as a repetitive version of a counter-based scheme) may often prove to be a more desirable choice for many application settings.

Figure 3:
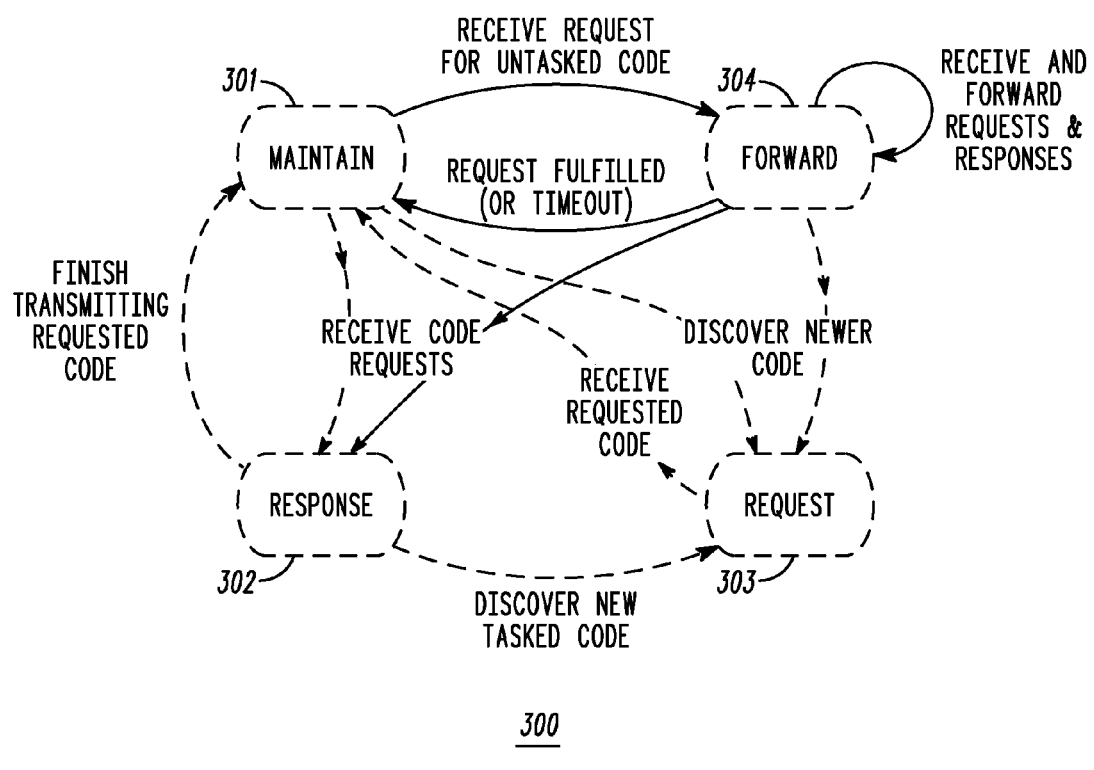
FIG. 3 comprises a state diagram as configured in accordance with various embodiments of the invention.

With that in mind, it may also be helpful to the reader to better understand a typical trickle approach and suitable alterations to that approach to better support these teachings. With reference to FIG. 3, wireless sensor node states as correspond to a typical trickle approach are shown in phantom lines and include a maintain state 301, a response state 302, and a request state 303 with the maintain state 301 representing the expected quiescent state. Whenever the wireless sensor node receives information regarding a new version of executable code of interest, the wireless sensor node switches to the request state 303 in order to transmit a corresponding request and to receive the corresponding response. The response state 302 facilitates reception of a code request from other wireless sensor nodes (and using such requests, for example, to facilitate discovering that new versions of such code exist) and effecting a responsive transmission of the requested code (presuming its local availability).

By these teachings, a fourth state can be accommodated comprising a forward state 304. By adding this capability to a trickle-configured wireless sensor node, the latter can then switch to the forward state 304 upon determining that another wireless sensor mode is seeking code for which the wireless sensor node is untasked. The wireless sensor node can remain in this state until, for example, the aforementioned time duration expires or until, for example, a need develops to switch to the request 303 or the response 302 states.

Those skilled in the art will appreciate that, as the only way to shift to the forward state 304 in this configuration is from the maintain state 301, the response and request states 302 and 303 have higher practical priority and hence priority will tend to favor the processing of requests for executable code that comprise the tasked responsibility of the wireless sensor node itself. Such a bias, of course, can be altered if so desired. As an alternative, one could create one instance of state machine 300 per executable code. As another alternative, one could create one instance of state machine 300 per subset of all known executable codes.

So configured, a wireless sensor node network can be readily programmed in a dynamic and segregated fashion without causing assured undue depletion of node or network resources. Required executable code will tend to make its way to points of need while, at the same time, avoiding the need for every node to be identically configured and/or for every node to react in a manner that tends to result in high redundancy and hence waste of network resource.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. For example, by one approach, information about available executable code (as versus the executable code itself) can be promulgated throughout a network, such that essentially every wireless sensor node has identical information regarding what versions of what executable code are available, and where. Taking such an approach, this characterizing information can be more aggressively disseminated throughout a network and then employed to inform a more passive approach to disseminating the corresponding executable code itself on a request-only basis.

We claim:

1. A method comprising:
   at a first wireless sensor node:
   requesting executable code,
   responding to requests from at least one other wireless sensor node for transport of executable code to the at least one other wireless sensor node, and
   maintaining executable code;
   determining whether to forward a request from at least one other wireless sensor node for transport of executable code to the at least one other wireless sensor node that the first wireless sensor node is itself not tasked with executing.

2. The method of claim 1 wherein
   requesting executable code,
   responding to requests from at least one other wireless sensor node for transport of executable code to the at least one other wireless sensor node, and
   maintaining executable code comprises:
   requesting executable code that the wireless sensor node is itself tasked with executing,
   responding to requests from at least one other wireless sensor node for transport of executable code that the wireless sensor node is itself tasked with executing to the at least one other wireless sensor node, and
   maintaining executable code that the wireless sensor node is itself tasked with executing.

3. The method of claim 1 wherein
   requesting executable code,
   responding to requests from at least one other wireless sensor node for transport of executable code to the at least one other wireless sensor node, and
   maintaining executable code comprises:
   requesting executable code using a trickle mode of operation,
   responding to requests from at least one other wireless sensor node for transport of executable code to the at least one other wireless sensor node using a trickle mode of operation, and
   maintaining executable code using a trickle mode of operation.

4. The method of claim 1 wherein determining whether to forward a request from at least one other wireless sensor node for transport of executable code to the at least one other wireless sensor node that the first wireless sensor node is itself not tasked with executing comprises, at least in part, determining whether the first wireless sensor node has locally cached the executable code.

5. The method of claim 1 wherein determining whether to forward a request from at least one other wireless sensor node for of executable code to the at least one other wireless sensor node that the first wireless sensor node is itself not tasked with executing comprises, at least in part:
   receiving the request from at least one other wireless sensor node;
   determining whether yet another wireless sensor node is responding to the request for transport of executable code;
   when the yet another wireless sensor node is responding to the request for transport of executable code, determining to not forward the request.

6. The method of claim 5 wherein determining whether the yet another wireless sensor node is responding to the request for transport of executable code comprises waiting for at least a predetermined period of time to provide time for the yet another wireless sensor node to so respond to the request for transport of executable code.

7. The method of claim 1 wherein determining whether to forward a request from at least one other wireless sensor node for transport of executable code to the at least one other wireless sensor node that the first wireless sensor node is itself not tasked with executing comprises, at least in part, making the determination based upon a number of hops to a known point of executable code injection as may be required to facilitate transport of the executable code from a source to a requesting wireless sensor node.

8. A wireless sensor node comprising:
   a memory having executable code stored therein;
   a wireless transmitter;
   a wireless receiver;
   a processor operably coupled to the memory, the wireless receiver, and the wireless transmitter and being configured and arranged to:
   request executable code,
   respond to requests from at least one other wireless sensor node for transport of executable code to the at least one other wireless sensor node, and
   maintain executable code;
   determine whether to forward a request for transport of executable code, which executable code the wireless sensor node is itself not tasked with executing.

9. The wireless sensor node of claim 8 wherein the executable code that the processor is configured and arranged to request, respond to requests for transport of, and maintain comprises executable code that the wireless sensor node is itself tasked with executing.

10. The wireless sensor node of claim 8 wherein the processor is further configured and arranged to request executable code using a trickle mode of operation, respond to requests from at least one other wireless sensor node for transport of executable code to the at least one other wireless sensor node using a trickle mode of operation, and maintain executable code using a trickle mode of operation.

11. The wireless sensor node of claim 8 wherein the processor is further configured and arranged to determine whether to forward a request from at least one other wireless sensor node for transport of executable code to the at least one other wireless sensor node that the wireless sensor node is itself not tasked with executing by, at least in part, determining whether the wireless sensor node has locally cached the executable code.

12. The wireless sensor node of claim 8 wherein the processor is further configured and arranged to determine whether to forward a request from at least one other wireless sensor node for transport of executable code to the at least one other wireless sensor node that the wireless sensor node is itself not tasked with executing by, at least in part:
   receiving the request from at least one other wireless sensor node;
   determining whether yet another wireless sensor node is responding to the request for transport of executable code;
   when the yet another wireless sensor node is responding to the request for transport of executable code, determining to not forward the request.

13. The wireless sensor node of claim 12 wherein the processor is further configured and arranged to determine whether yet another wireless sensor node is responding to the request for transport of executable code by waiting for at least a predetermined period of time to provide time for the yet another wireless sensor node to so respond to the request for transport of executable code.

14. The wireless sensor node of claim 8 wherein the processor is further configured and arranged to determine whether to forward a request from at least one other wireless sensor node for transport of executable code to the at least one other wireless sensor node that the wireless sensor node is itself not tasked with executing by, at least in part, making the determination based upon a number of hops to a known point of executable code injection as may be required to facilitate transport of the executable code from a source to a requesting wireless sensor node.

15. A method comprising:
   at a first wireless sensor node:
      determining a need for executable code to be executed by the first wireless sensor node;
      transmitting a request for transport of the executable code;
   at a second wireless sensor node:
      requesting executable code,
      responding to requests from the first wireless sensor node for transport of executable code to the first wireless sensor node, and
      maintaining executable code which executable code the second wireless sensor node is tasked to execute;
   receiving the request for transport of executable code;
   upon determining that the request for transport of executable code comprises a request for transport of executable code that the second wireless sensor node is not tasked to execute, determining whether to forward the request for transport of executable code.

16. The method of claim 15 wherein
   requesting executable code,
   responding to requests from at least one other wireless sensor node for transport of executable code to the at least one other wireless sensor node, and
   maintaining executable code which executable code the second wireless sensor node is tasked to execute comprises:
      requesting executable code using a trickle mode of operation,
      responding to requests from at least one other wireless sensor node for transport of executable code to the at least one other wireless sensor node using a trickle mode of operation, and
      maintaining executable code using a trickle mode of operation.

17. The method of claim 15 wherein determining whether to forward the request from at least one other wireless sensor node for transport of executable code to the at least one other wireless sensor node comprises, at least in part, determining whether the first wireless sensor node has locally cached the executable code that is being requested.

18. The method of claim 15 wherein determining whether to forward the request from at least one other wireless sensor node for transport of executable code to the at least one other wireless sensor node comprises:
   determining whether yet another wireless sensor node is responding to the request for transport of executable code;
   when the yet another wireless sensor node is responding to the request for transport of executable code, determining to not forward the request.

19. The method of claim 18 wherein determining whether the yet another wireless sensor node is responding to the request for transport of executable code comprises waiting for at least a predetermined period of time to provide time for the yet another wireless sensor node to so respond to the request for transport of executable code.

20. The method of claim 15 wherein determining whether to forward the request from at least one other wireless sensor node for transport of executable code to the at least one other wireless sensor node comprises, at least in part, making the determination based upon a number of hops to a known point of executable code injection as may be required to facilitate transport of the executable code from a source to the first wireless sensor node.

* * * * *

UNITED STATES PATENT AND TRADEMARK OFFICE
CERTIFICATE OF CORRECTION

| | | |
|---|---|---|
| PATENT NO. | : 7,676,805 B2 | |
| APPLICATION NO. | : 11/278680 | |
| DATED | : March 9, 2010 | |
| INVENTOR(S) | : Yu et al. | |

It is certified that error appears in the above-identified patent and that said Letters Patent is hereby corrected as shown below:

IN THE CLAIMS

In Column 8, Line 22, in Claim 5, delete "for" and insert -- for transport --, therefor.

Signed and Sealed this
Twelfth Day of June, 2012

David J. Kappos
*Director of the United States Patent and Trademark Office*